M. A. DAVIS.
AUTOMOBILE WINDLASS.
APPLICATION FILED JUNE 21, 1919.
1,321,366.
Patented Nov. 11, 1919.
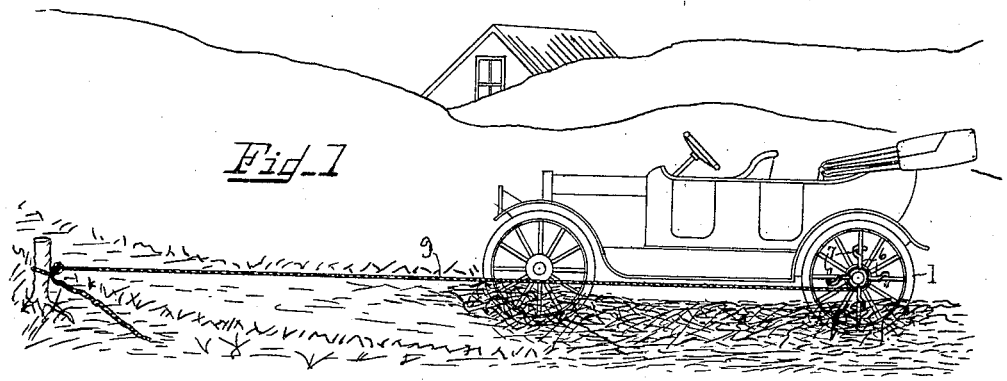
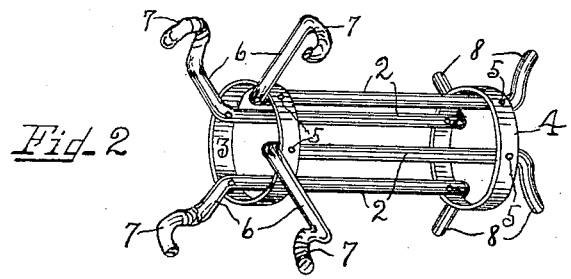
Inventor.
Marion A. Davis.
By J. P. Dederick.
Attorney.

UNITED STATES PATENT OFFICE.

MARION A. DAVIS, OF SHERMAN, TEXAS.

AUTOMOBILE-WINDLASS.

1,321,366.     Specification of Letters Patent.     Patented Nov. 11, 1919.

Application filed June 21, 1919. Serial No. 305,832.

*To all whom it may concern:*

Be it known that I, MARION A. DAVIS, a citizen of the United States, residing at Sherman, in the county of Grayson and State of Texas, have invented certain new and useful Improvements in Automobile-Windlasses, of which the following is a specification.

This invention has reference to improvements in automobile windlasses and is designed to provide a device whereby automobiles when stalled in mud, sand or other impediment, may be readily and quickly extricated.

The invention will be best understood from a consideration of the following detailed description, taken in connection with the accompanying drawings forming a part of this specification, with the further understanding that while the drawings illustrate a practical form of the invention, the latter is susceptible of other practical embodiments, and, therefore is not confined to any strict conformity with the showing of the drawings, but may be changed and modified so long as such changes and modifications mark no material departure from the salient features of the invention.

In the drawings:—Figure 1 is a side elevation of a stalled automobile showing the extricating means attached. Fig. 2 is an enlarged view in perspective of the windlass only.

Referring to the drawings, there is shown an automobile which is assumed to be stalled in the mud, the showing being to a large extent typical rather than illustrative of any particular style of car, since they may vary considerably in structure, and the showing of Fig. 1 is therefore to be taken as indicative of any type of car.

To the rear wheel 1 of the car the windlass is attached, the same being formed of four horizontal rod portions 2, equally spaced radially and interiorly of bands 3 and 4 to which they are secured by rivets 5, thus forming the drum of the windlass. The ends of the rod portions 2, after extending through the bands 3, are bent at right angles and radially to said portions as designated by 6, and they terminate respectively in outward semicircular bends 7, adapted for engagement with any series of four spokes of the wheel that cross at right angles, and by which the windlass is held in operative position. The opposite ends of the portions 2 have radial, right angular bends 8, slightly curved outwardly, and they act as a guard for the rope 9 when being wound on the drum.

When not required for use, the rope may be wound upon the drum and the device placed under a seat of the car. When needed it is quickly attached to the spokes of a rear wheel, the rope unwound and secured to a suitable anchorage, when the engine being started and the wheels revolved will cause the rope to be wound upon the drum, and the car tugged to a more permanent roadway.

Having thus described my invention, what I esteem as new and desire to secure by Letters Patent of the United States is:—

The combination in an automobile windlass of horizontally disposed rods, and bands supporting the same forming the drum thereof, both ends of said rods being bent radially and at right angles to the said horizontal portions, the upper ends of the inner bent portions terminating in outward semicircular bends adapted for engagement with the spokes of a wheel, and the bends at the opposite ends of said horizontal rods slightly outwardly curved to act as a guard for the rope, as set forth.

In testimony whereof I affix my signature.

MARION A. DAVIS.

Copies of this patent may be obtained for five cents each, by addressing the "Commissioner of Patents, Washington, D. C."